Nov. 30, 1937.  H. W. ZIMMERMAN  2,100,534
PISTON FIXTURE
Filed June 6, 1936   2 Sheets-Sheet 2
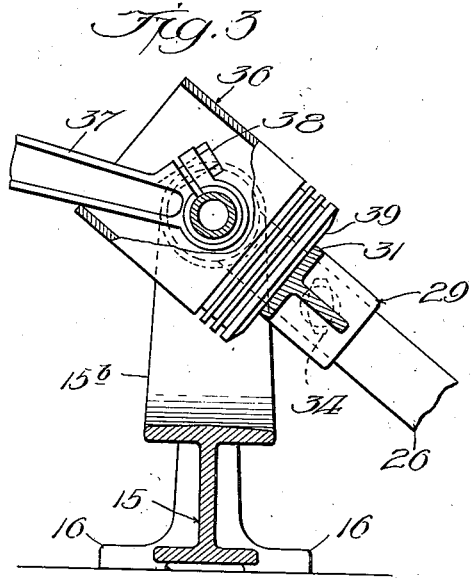
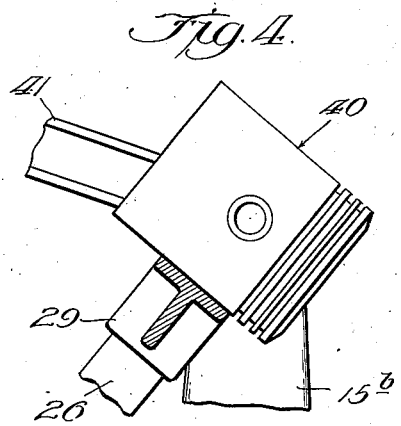
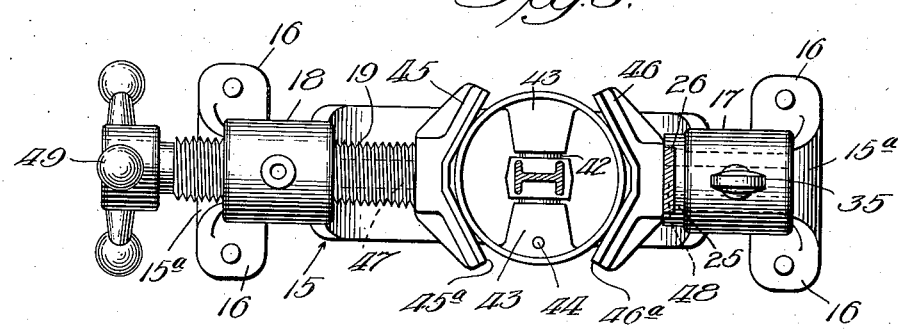
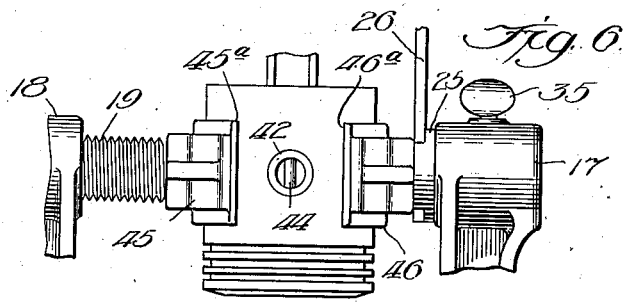
Inventor:
Herman W. Zimmerman
by Davis, Lindsey, Smith & Shonts
Attys.

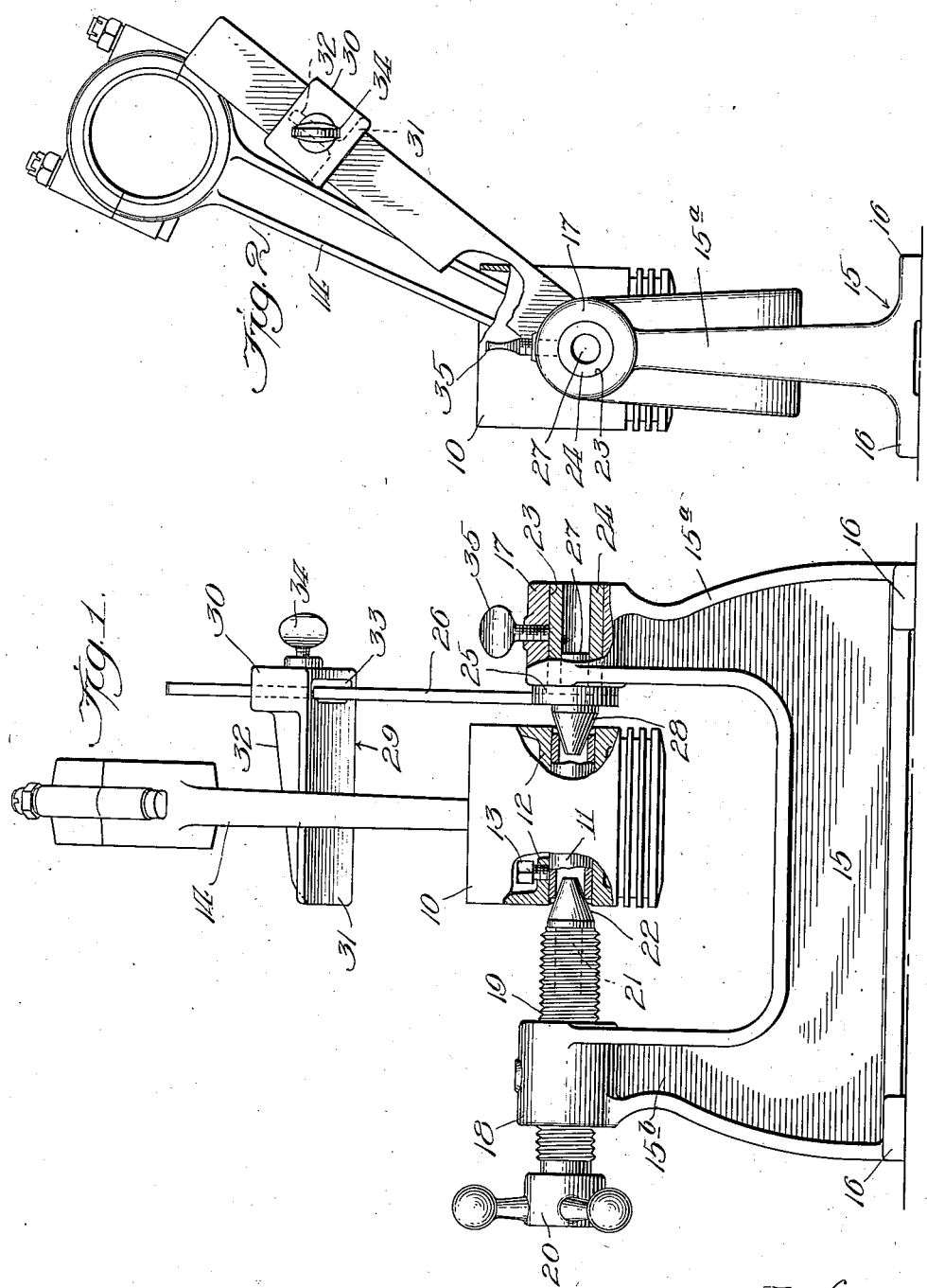

Patented Nov. 30, 1937

2,100,534

UNITED STATES PATENT OFFICE 2,100,534

PISTON FIXTURE

Herman W. Zimmerman, North Chicago, Ill., assignor to Automotive Maintenance Machinery Co., North Chicago, Ill., a corporation of Illinois Application June 6, 1936, Serial No. 83,925

11 Claims. (Cl. 29—89)

My invention relates to a piston supporting fixture, and it has to do particularly with a fixture well suited for use in servicing automotive piston and connecting rod assemblies.

In the methods heretofore employed in assembling and disassembling automotive pistons and connecting rods, there is always the tendency to distort and damage either the piston or the connecting rod, or both. As is well known, various forms of locking devices are employed for fixing piston pins in the piston pin bosses so that the connecting rod is rotatable thereabout, or fixing the connecting rod to the piston pin with the ends of the pin rotatable in the piston pin bosses. These locking devices are usually disposed within the piston skirt adjacent the piston pin bosses, where they are not readily accessible. It is necessary at times to apply considerable force to a suitable tool for removing and releasing such devices after the piston assembly has been in use a long time and such devices have become somewhat frozen, so to speak, in position. Also, in assembly work, considerable force is required to set these devices to their proper locking position.

Heretofore, in both assembling and disassembling pistons and connecting rods, it has been customary to grip an intermediate part of the connecting rod in a vise, and at times the piston itself may be so held while the locking devices are released,—with the resultant distortion and damage above referred to due to the torsional strains and stresses applied to these parts in using the force necessary to release or set up the locking devices. I have found that it is not an unusual experience in reassembly of the piston and connecting rod, after disassembly and servicing of the same, to discover that the connecting rod has been twisted out of alignment and the piston and connecting rod have been otherwise distorted and damaged. These conditions cause unnecessary servicing operations which add to the time and cost thereof, and, many times they result—particularly where the workman is not highly skilled,—in improperly aligned connecting rods being assembled after the servicing operation.

One of the objects of my invention is to avoid the foregoing objectionable conditions in the servicing of piston and connecting rod assemblies.

Another object is to provide a supporting fixture which is adapted to support the piston and connecting rod in such a way that, regardless of the force required to release and remove or set up the locking devices above mentioned, the piston or connecting rod will not be distorted.

A further object is to provide a fixture of the foregoing character which is adapted to directly engage and firmly hold the piston by engaging the same at right angles to the axis thereof and to, at the same time, support both the piston and the connecting rod at any desired angle for ready access to the piston pin or connecting rod locking devices, as the case may be.

Still another object is to provide a fixture adapted to engage the opposite ends of the piston pin for support of the piston, and to provide additional and adjustable means adapted to engage either the connecting rod or the piston for holding these parts in any particular position to which they may be adjusted, the arrangement being such that the piston may be held non-rotatably in any desired position about its support for performing any desired servicing operation thereon.

Another object is to provide a fixture of the foregoing character which is not only quite simple in construction and very cheap to manufacture, but it is exceedingly sturdy and durable and is capable of withstanding rough usage without decrease in its supporting efficiency.

Other objects and advantages, some of which lie in the form and relationship of the fixture parts, will become obvious as this description progresses and by reference to the drawings, wherein,—

Fig. 1 is a side elevational view, partially in section, of one form of fixture embodying my invention, the same being illustrated in position for supporting one kind of piston and connecting rod assembly;

Fig. 2 is an end elevational view of the structure shown in Fig. 1;

Fig. 3 is a vertical sectional view of the tool shown in the previous figures and having its parts differently positioned for supporting a piston and connecting rod assembly;

Fig. 4 is a view similar to Fig. 3 but showing still another manner of supporting a piston and connecting rod assembly in the use of my invention;

Fig. 5 is a top plan view of a slightly modified form of fixture embodying my invention; and Fig. 6 is a fragmentary, side elevational view of the structure shown in Fig. 5.

In Figs. 1 and 2, I have shown a fixture supporting a conventional type of piston 10 having a piston pin 11 fixedly secured or locked in the piston pin bosses 12 by a locking screw or device 13. A connecting rod 14 is rotatably mounted on the piston pin 11 in the customary manner. In the use of my invention, both the piston and connecting rod are preferably supported in an inverted position where ready access may be had to the locking screw 13 for assembly or disassembly of the piston and rod structure.

The fixture shown in Figs. 1 and 2 includes a U-shaped base part 15 having laterally-extending feet 16 at its opposite ends that may be secured in any desired manner to a suitable support. The upstanding U-arms 15a, 15b of the base are provided at their upper ends with support members or bosses 17, 18 which carry the parts for supporting and positioning the piston and connecting rod.

The boss 18 is provided with a comparatively large threaded opening adapted to receive a screw member 19 having a handle 20 that may be readily grasped and actuated to move the screw 19 toward and from the piston 10. The screw 19 is provided at its inner end with an opening for the reception of the shank or stem 21 of a cone-shaped supporting member 22, which is of sufficient size for entry of the same into the adjacent end of the piston pin 11. The cone support 22 is readily removable, and variable sized cones or any other suitable supporting device may be readily substituted therefor.

The boss 17 is provided with a comparatively large and unthreaded opening 23 which is adapted to snugly receive a tubular shaft-like part 24 having an enlarged head or flange part 25 abutting the inner surface of the boss 17 and supporting an elongated bar or arm 26 which extends at right angles to the axis of the shaft 24. The tubular head and shaft 24, 25 slidably and snugly receives the shank or stem 27 of another cone-shaped member 28, similar to the cone member 22, the end of which enters and engages the other, or adjacent, end of the piston pin 11. It will be seen that, with the foregoing arrangement, when a piston of the type shown at 10 is placed between the cone members 22, 28 and the screw member 19 is set into the position shown in Fig. 1, the piston 10 is firmly supported through the piston pin and at the piston pin bosses, which parts are quite strong and will avoid distortion of the piston. In fact, by supporting the piston through engagement with the piston pin, torsional strains and stresses applied in detaching the parts will be exerted mainly on the piston pin, thereby directly avoiding any tendency to distort or otherwise damage the piston.

My invention further includes a separate support for the connecting rod 14, which support is adjustable so that it may also serve as an additional support for the piston 10 to avoid the tendency of the piston, under certain conditions, to rotate about its support. To this end, an adjustable supporting device 29 is mounted on the arm 26 above described. More particularly, the supporting device 29 is L-shaped, providing a base part 30 and a right-angled, smooth-faced leg 31 adapted to extend laterally past the connecting rod 14. The parts 30 and 31 are additionally joined by a strengthening web 32, providing a strong and durable supporting device. The base part or leg 30 of the supporting device is provided with a slideway 33 adapted to slidably receive the supporting arm 26, and the device 29 is adapted to be locked in any desired position along the arm 26 by a set screw 34.

It will be seen from the foregoing that the tubular shaft 24 is rotatably mounted so that the arm 26 thereon may be rotated to various positions around the axis of the cone supports 22, 28 and the piston pin 11. In other words, if it is desirable to hold the piston 10 in an upright position as shown in Figs. 1 and 2, the supporting device 29 may be adjusted along the arm 26 so as to support the connecting rod at any desired angle where it will not interfere with work within the skirt of the piston. The arm 26 may be swung from one side to the other of the axis of the supporting cones 22, 28 so that the connecting rod 14 may be supported at the desired inclination on either side. This avoids any tendency for the piston to rotate out of its set position due to the weight of the connecting rod, which would, otherwise, fall over and rest against the inverted skirt of the piston. That is to say, the connecting rod support is independent of the piston support so that any tendency of either of these parts to move will not affect the other. It will also be seen that, since the head portion 25 carrying the arm 26 is confined between the cone member 28 and the boss 17, the mere setting up of the screw spindle 19 will tend to hold the arm 26 in desired position against accidental displacement. However, the leverage action in this arm is sufficient to permit it to be independently adjusted to its intended position by the application of force applied thereto. To avoid any possible movement of the arm 26 after the parts have been set into their intended positions, I employ a set screw 35 which, when tightened, locks the shaft 24 and arm 26 against rotation.

In cases where the connecting rod is non-rotatably secured to the piston pin, it may be desirable, for accessibility convenience, to support the piston in the manner illustrated in Fig. 3. More particularly, the piston pin may be engaged and supported by the cone devices 22, 28 shown in Fig. 1, with the piston held at an angle with respect to the vertical and with the connecting rod tilted over and supported against the inverted bottom wall of the piston for ready accessibility to the locking bolt 38. In this case, to avoid the tendency of the piston 36 to rotate under the weight of the connecting rod, the connecting rod supporting arm 26 is rotated to a position wherein the smooth face of the device 29 is disposed against the head 39 of the piston. With the supporting face of the device 29 in firm, flush engagement with the piston head, the locking screw 35 is tightened and the piston is held firmly against movement in any direction for the removal of the lock bolt 38 or for any other operation that the workman may wish to perform on the piston or the assembly.

If desired, the piston may be supported in the manner shown in Fig. 4 with equally good results. In this case, the piston 40 and connecting rod 41 may correspond to the piston 36 and connecting rod 37, respectively, of Fig. 3, but the supporting arm 26 and its device 29 are moved so that the latter will engage the under side wall portion of the piston skirt to support the same during the assembly and disassembly operations.

In some cases, the piston pins may be secured non-rotatably within the piston pin bosses by a locking device passing through the pin and preventing the use of cone devices that enter the ends of the pin. Such an arrangement is shown in Figs. 5 and 6, wherein the piston pin 42 is held non-rotatably in the piston pin bosses 43 by a pin 44 passing through the bosses 43 and the outer end of the pin. Also, where piston pins of the so-called floating type (freely rotatable with respect to both the bosses and the connecting rod) are employed, spring locking rings are provided in the grooves at the ends of the piston pins (not shown) for holding the pins against axial displacement. In that case, the cone devices 22, 28 of Fig. 1 would not serve as suitable supports for the piston. In that case, like in the case shown in Fig. 5, I preferably employ jaw-like supporting devices instead of the cone supports 22, 28. More particularly, referring to Figs. 5 and 6, the structure illustrated is the same as that of Figs. 1 and 2 except that V-jaw members 45, 46 are substituted for the cone devices 22, 28, respectively. These jaw devices are provided with stems 47 and 48 which correspond to the cone stems 21, 27. The V-jaw members 45, 46, when the hand wheel 49 is set up, grippingly engage the side wall of the piston and hold it firmly with the ends of the openings in the piston pin bosses accessible for removal of the pin holding means. The piston and connecting rod may be additionally supported in either of the ways shown in Figs. 1 to 4, inclusive. The jaw devices may also be provided with a suitable lining material (fabric or the like) 45ᵃ and 46ᵃ to prevent marring of the piston surface.

I believe that the operation and advantages of my invention will be understood from the foregoing description. This fixture fills a particular need in the automotive service field and it enables the workmen, even unskilled ones, to assemble and disassemble connecting rods and piston quickly and easily without any danger of distorting or damaging the same, all of which is conducive not only to improved service work but reduced cost of the same. Various servicing operations are performed on automotive pistons, and a fixture embodying my invention is well suited for support of the piston for any operation that the service man wishes to perform thereon.

It is to be understood that, although I have shown certain forms of my invention, other changes in details and arrangements of parts may be resorted to without departing from the spirit and scope of my invention as defined by the claims that follow.

I claim:

1. In structure of the class described, a self-contained unit comprising a frame, adjustable means carried by said frame for engaging and supporting a part of the piston structure, and separate means adjustably carried by said frame and movable relatively to said means and to a connecting rod assembled with the piston for independently supporting the connecting rod at any desired position relative to the piston.

2. In structure of the class described, a self-contained unit comprising a frame, adjustable means carried by said frame for engaging and supporting a part of the piston structure, a separate means carried by said frame and including a part movable relative to said first means and to the piston structure for independently engaging and supporting a connecting rod assembled with the piston, said means including said part thereof being adjustable also to a position wherein said part engages and additionally supports the piston.

3. In structure of the class described, a self-contained unit comprising a frame, means carried by said frame and adjustable toward and from the piston pin of the piston structure for engagement with the pin to support the piston structure, and separate means carried by said frame and mounted for movement as a whole angularly relative to said first means, said separate means having a part adapted to engage a connecting rod assembled with the piston structure and support the same in different angular positions relative to the piston structure and in addition to the support afforded by the piston structure.

4. In structure of the class described, a frame having a pair of aligned support members spaced apart sufficiently to receive a piston therebetween, means including a device carried by said support members and adjustable toward and from the piston pin carried by the piston for engaging the piston pin to support the piston structure as a whole, and means including another device rotatably carried by one of said support members and having a part for engaging and supporting a connecting rod assembled with the piston at different angles relative to the piston.

5. In structure of the class described, a frame having a pair of aligned support members spaced apart sufficiently to receive a piston therebetween, means including a device carried by said support members and adjustable toward and from the piston pin carried by the piston for engaging the ends of the piston pin to support the piston structure as a whole, and means including one part rotatably carried by one of said support members and having a second part for engaging and supporting at different angular positions a connecting rod assembled with the piston, said second part being adjustable to a plurality of positions relative to said first part, in at least one of which positions said second part is engageable with and additionally supports the piston.

6. In structure of the class described, a frame having a pair of aligned support members spaced apart sufficiently to receive a piston therebetween, devices carried by said support members and engageable with the piston structure at diametrically opposite points, one of said devices being mounted for movement relative to its support member and toward and from the piston, another supporting member rotatably supported by one of said first mentioned support members, means for fixing said rotatable supporting member in different rotative positions, and a support device adjustably carried by said rotatable support member for engaging and additionally supporting the piston and/or a connecting rod assembled with the piston.

7. In structure of the class described, a self-contained unit comprising a frame, means carried by said frame and adjustable toward and from the piston pin of the piston structure for engagement with the pin to support the piston structure, and separate means carried by said frame and mounted for movement as a whole angularly relative to said first means, said separate means having a part adapted to engage a connecting rod assembled with the piston structure and support the same in different angular positions relative to the piston structure and in addition to the support afforded by the piston structure, said part being mounted for movement toward and from the means supporting the piston structure independently of its movement with said separate means as a whole.

8. In structure of the class described, a frame, spaced and aligned support members on said frame, an adjustable member carried by one of said support members, a piston holding device removably carried by said adjustable member, another piston holding device carried by the other of said support members, an arm rotatably supported by one of said support members, and a device carried by said arm and movable longitudinally thereon and adapted to engage the piston and/or a connecting rod assembled with the piston, dependent upon the position to which said arm is rotated.

9. In structure of the class described, a frame, spaced and aligned support members on said frame, a screw member carried by one of said support members, a support device having a stem removably received in the end of said screw member and a cone-shaped head adapted to enter and engage the adjacent end of a piston pin carried by the piston, an arm having a shaft rotatably mounted in the other of said support members, a second support device similar to the first having its stem removably received in said arm shaft, and a device carried by said arm and movable longitudinally thereon for additionally supporting the piston and/or a connecting rod assembled with the piston, dependent upon the position of said arm.

10. In structure of the class described, a frame, a pair of spaced and aligned support members carried by said frame, an adjustable member carried by one of said support members, a piston supporting element having a stem removably received in the end of said adjustable member and also having a V-shaped jaw adapted to embrace the side wall of the piston, an arm having a right-angled shaft rotatably mounted in one of said support members, another supporting element similar to the first having its stem removably received in said shaft, and a device slidably carried by said arm for adjustment therealong for engaging and supporting the piston and/or a connecting rod assembled with the piston, dependent upon the position of said arm.

11. In structure of the class described, a frame, a pair of spaced and aligned support members carried by said frame, a screw member carried by one of said support members, a piston supporting element removably carried by said screw member, an elongated arm having an angularly disposed shaft rotatably supported in the other of said supporting members, another piston supporting element removably carried by said shaft, a device slidably mounted on said arm and having a part extending at substantially right angles to said arm and having a smooth face, said device, dependent upon the position of said arm, being adjustable to positions wherein its smooth face engages the side wall or head end of the piston or wherein said part thereof engages and supports a connecting rod assembled with the piston.

HERMAN W. ZIMMERMAN.